United States Patent
Yoon et al.

(10) Patent No.: US 6,411,593 B1
(45) Date of Patent: Jun. 25, 2002

(54) OPTICAL DISC SUBSTRATE

(75) Inventors: Du-Seop Yoon; Chang-Min Park, both of Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/535,982

(22) Filed: Mar. 27, 2000

(30) Foreign Application Priority Data

Mar. 25, 1999 (KR) .............................. 99-10272

(51) Int. Cl.[7] ................................. G11B 7/24
(52) U.S. Cl. ................................. 369/275.4
(58) Field of Search ....................... 369/275.4

(56) References Cited

U.S. PATENT DOCUMENTS 5,822,294 A * 10/1998 Ohtomo et al. .......... 369/275.4
5,991,258 A * 11/1999 Morita ..................... 369/275.4
6,128,271 A * 10/2000 Ohta ....................... 369/275.4

* cited by examiner

Primary Examiner—Aristotelis M. Psitos
(74) Attorney, Agent, or Firm—Staas & Halsey LLP

(57) ABSTRACT

An optical disc substrate with deep grooves having a depth of $\lambda/4n$ to $\lambda/2n$, where $\lambda$ is the wavelength of a laser beam of an optical pickup and n is the refractive index of the optical disc substrate. The optical disc substrate includes a plurality of deep grooves having a predetermined depth, individual ones of the deep grooves having sidewalls slanted at an angle of $\theta$; and a plurality of lands having the same level as the surface of the substrate, wherein a depth D of the deep grooves for minimum crosstalk is determined by the following mathematical relation $$D=0.4022-0.4574 \times A+0.6458=A^2, \qquad [1]$$

where D=physical groove depth$\times n/\lambda$.

$$A = \frac{NA \cdot TP}{\lambda} \times \frac{1}{\sin^2\theta},$$

TP indicates the track pitch of the optical disc substrate, NA indicates the numerical aperture of an objective lens of the optical pickup, $\theta$ is a slant angle of the deep grooves between a top surface of the lands and sidewalls of the deep grooves, $\lambda$ is the wavelength of a laser beam of the optical pickup; and n is the refractive index of the optical disc substrate.

14 Claims, 4 Drawing Sheets

OPTICAL DISC SUBSTRATE

CROSS-REFERENCE TO RELATED APPLICATIONS

This application claims the benefit of Korean Application No. 99-10272, filed Mar. 25, 1999, in the Korean Patent Office, the disclosure of which is incorporated herein by reference.

BACKGROUND OF THE INVENTION

1. Field of the Invention

The present invention relates to a substrate of an optical disc with lands and grooves, and more particularly, to an optical disc substrate with deep grooves having a depth of $\lambda/4n$ to $\lambda/2n$, where $\lambda$ is the wavelength of a laser beam emitted from an optical pickup to record/read index from the optical disc and n is the refractive index of the optical disc substrate.

2. Description of the Related Art

Optical discs are information recording media adopted by a disc player, which writes and/or reads information in a non-contact manner. The need for a high recording density at a limited data recording region has provided a suggestion for an optical disc substrate which allows data writing on both its grooves and lands.

FIG. 1 is a schematic view of an existing optical disc substrate adopting a land-and-groove recording method. As shown in FIG. 1, an optical disc substrate 1 comprises a plurality of tracks spirally formed from the center to the periphery of an optical disc, alternately forming a plurality of grooves 3 having a predetermined depth and a plurality of lands 5 having the same level as the surface of the optical disc substrate.

In particular, the format book for a 2.6-gigabyte DVD-RAM suggests a ratio of the land width and the groove width be approximately 50:50. A land-and-groove recording method applied to such an optical disc having the above configuration is advantageous in that a difference in height between lands and grooves reduces crosstalk, which is noise generated from adjacent tracks, and writing on both lands and grooves increases the recording density. Another advantage of the land-and-groove recording method is a larger amplitude of a pushpull signal compared to a recording method which allows writing on only either lands or grooves. This larger amplitude of the push-pull signal is because an optical track pitch which causes the push-pull signal is half as small as a data track pitch.

For a high recording density in optical discs having the above configuration, the track pitch (TP) must be reduced. In this case, the size of a write beam spot must be reduced to keep writing and reading characteristics. However, as the recording capability of optical DVDs increases, a relative track pitch with respect to the write beam spot size decreases, which is shown in Table 1, causing "cross erase" which refers to erasure of signals on adjacent tracks, and thus limiting the increase in recording density.

TABLE 1

| | Type of Recording Media | | | |
| --- | --- | --- | --- | --- |
| Items | 2.6 GB DVD-RAM | 4.7 GB DVD-RAM | 15 GB HD-DVD | 18 GB HD-DVD |
| Wavelength of laser beam (nm) | 650 | 650 | 400 | 400 |
| Numerical aperture (NA) | 0.6 | 0.6 | 0.6 | 0.65 |
| Track pitch ($\mu$m) | 0.74 | 0.615 | 0.34 | 0.30 |
| Ratio of track pitch to beam spot size | 0.68 | 0.57 | 0.51 | 0.49 |

The cause of cross erase can be summarized into two factors. One is thermal absorption of the write beam by adjacent tracks, and the other is thermal transfer to adjacent tracks during writing. The thermal transfer between recording layers in an optical disc, which causes a temperature increase in the optical disc can be avoided by spacing adjacent tracks further apart.

In this way, an optical disc with deep grooves has been proposed. In a case such as an optical disc, the groove depth is larger than the groove depth Gd, $\lambda/6n$, where $\lambda$ is the wavelength of a laser beam of an optical pickup and n is the refractive index of an optical disc substrate, of a general optical disc, which elongates the thermal conductive distance and in turn suppresses the occurrence of both cross erase and crosstalk. However, the problem with deep-groove optical discs is the phase reversion of a tracking error signal, the so called "push-pull signal," at a depth below that of a predetermined depth.

FIG. 2 shows the push-pull ratio (PPR), divided push-pull ratio (DPP) and on-track ratio (OTR) for a 4.7-gigabyte DVD-RAM with respect to the depth of grooves.

Phase reversal of the push-pull signal means that the deep grooves are tracked according to the tracking conditions for lands of a general optical disc as shown in FIG. 1. Since the tracking conditions for lands and grooves cannot be the same, the DVD-RAM format described with reference to FIG. 1 delimits the depth of grooves to be less than or equal to $\lambda/4n$, where $\lambda$ is the wavelength of a laser beam for an optical pickup to record/read data on/from the optical disc and n is the refractive index of an optical disk substrate, which permits the same phase of push-pull signals for lands and grooves.

The crosstalk signal and push-pull signal are influenced by a slant angle $\theta$ of the grooves. As shown in FIG. 1, the slant angle $\theta$ of grooves refers to the angle between a top surface of the lands and the groove sidewalls (or also described as a lateral extension of the lands or the grooves and an extension of the groove sidewalls).

FIG. 3 illustrates the crosstalk and the push-pull signal for an optical pickup adopting an objective lens having a numerical aperture (NA) of 0.6 with respect to the groove depth when the slant angle $\theta$ of grooves is 60° and 80°. In FIG. 3, A and B indicate the crosstalk signals at the slant angle $\theta$ of grooves of 60° and 80°, respectively. C and D indicate the push-pull signals at the slant angle $\theta$ of grooves of 60° and 80°, respectively.

For the result of FIG. 3, the groove depth has been normalized based on the wavelength ($\lambda$) of the incident laser beam and the refractive index (n) of the disc substrate. In FIG. 3, the horizontal dashed line at the push-pull signal of 0 indicates an optical groove depth of $\lambda/4n$. Thus, it can be concluded that the optical groove depth for a predetermined wavelength of a laser beam varies depending on the slant angle θ of grooves even at the same physical groove depth (the physical groove depth is an absolute depth without taking into account the refractive index n and the wavelength λ of the optical disc substrate, and the optical groove depth is the depth taking n and λ into account). Also, as previously mentioned, the phase of the push-pull signal reverses around the optical groove depth of λ/4n. Also, the push-pull signal of deep grooves varies depending on the slant angle θ of grooves.

FIG. 3 shows that when the physical depth of the grooves is small, the effect of the slant angle θ of the grooves on the variation of the push-pull signal and the crosstalk signal is negligible, compared to that of the groove depth. However, as the physical depth of grooves increases, variations of the push-pull signal and crosstalk signal with respect to the slant angle θ of grooves, i.e., at 60° and 80°, increase.

SUMMARY OF THE INVENTION

To solve the above problems, it is an object of the present invention to provide an optical disc substrate with deep grooves having a depth of λ/4n or more, where λ is the wavelength of a laser beam from an optical pickup and n is the refractive index of a substrate, which results in improved crosstalk and cross erase characteristics.

Additional objects and advantages of the invention will be set forth in part in the description which follows and, in part, will be obvious from the description, or may be learned by practice of the invention.

The objects of the present invention is achieved by an optical disc substrate for land-and-groove recording, comprising: a plurality of deep grooves having a predetermined depth, individual ones of the deep grooves having sidewalls slanted at an angle of θ; and a plurality of lands having the same level as the surface of the optical disc substrate, wherein a depth D of each of the grooves for minimum crosstalk is determined by the following mathematical relation [1]

$$D = 0.4022 - 0.4574 \times A + 0.6458 \times A^2 \quad [1]$$

where

D = physical groove depth × n/λ.

$$A = \frac{NA \cdot TP}{\lambda} \times \frac{1}{\sin^2 \theta},$$

TP indicates the track pitch of the optical disc substrate,

NA indicates a numerical aperture of an objective lens of an optical pickup,

θ is the slant angle of the grooves between a top surface of lands and sidewalls of the grooves, λ is the wavelength of a laser beam of the optical pickup which is radiated on the optical disc through the objective lens for the land-and-groove recording, and n is the refractive index of the optical disc substrate.

BRIEF DESCRIPTION OF THE DRAWINGS

The above and other objects and advantages of the present invention will become more apparent by describing in detail a preferred embodiment thereof with reference to the attached drawings in which.

DESCRIPTION OF THE PREFERRED EMBODIMENT

Figure 1:
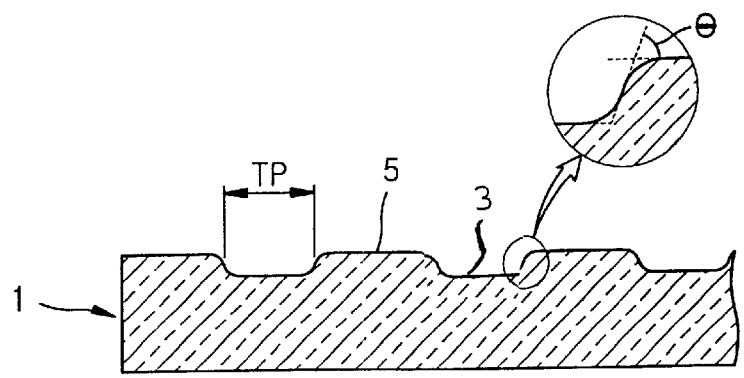
FIG. 1 is a sectional view of a conventional optical disc substrate of an optical disc employing a land-groove recording method.
Figure 2:
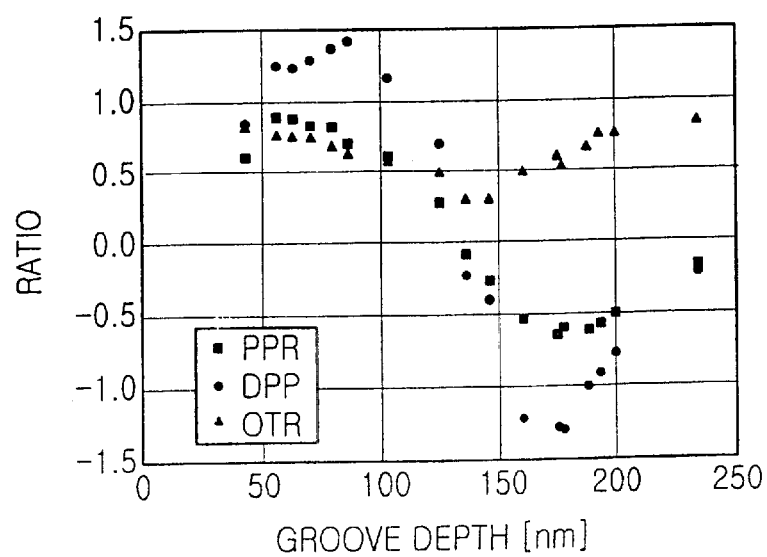
FIG. 2 illustrates the push-pull ratio (PPR), the divided push-pull ratio (DPP), and the on-track ratio (OTR) for a 4.7 gigabyte DVD-RAM with respect to the depth of grooves formed on an optical disc.
Figure 3:
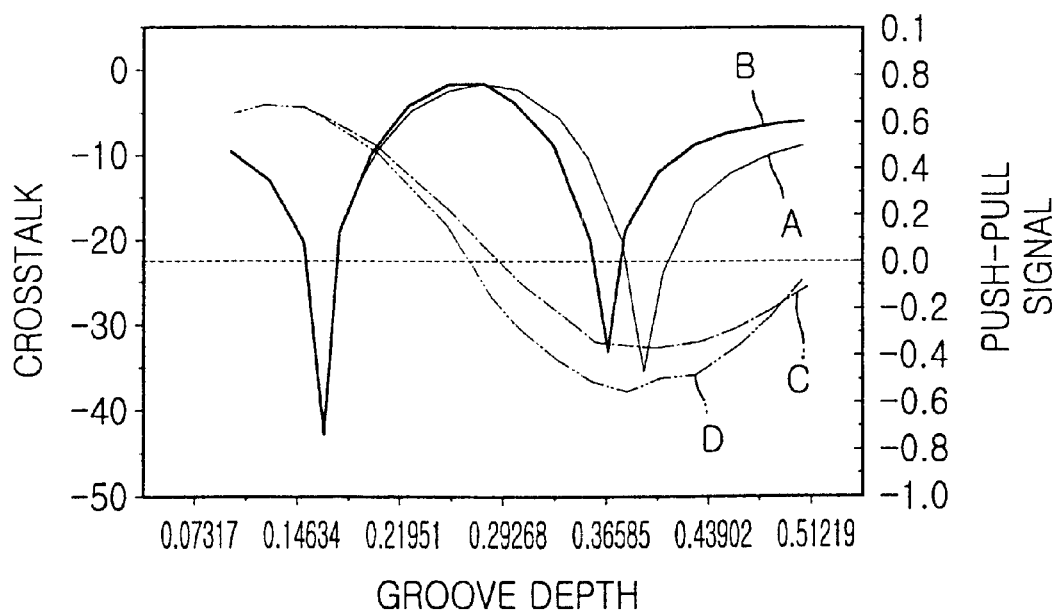
FIG. 3 illustrates the crosstalk signal and push-pull signal for an optical pickup adopting an objective lens having a numerical aperture (NA) of 0.6 with respect to the depth of the grooves when the slant angle θ of the grooves is 60° and 80°.

Similar to the conventional optical disc described with reference to FIG. 1, a substrate of an optical disc according to an embodiment of the present invention includes a plurality of deep grooves having a predetermined depth and a plurality of lands having the same level as the surface of the substrate. The grooves have sidewalls slanted at an angle of θ.

The present invention relates to delimiting the depth and slant angle θ of the deep grooves of an optical disc substrate using mathematical relations based on the result of experiments, and improving crosstalk, cross erase and tracking characteristics in a deep groove configuration with a depth greater than or equal to λ/4n, where λ is the wavelength of a laser beam of an optical pickup used to record and reproduce data on/from the optical disc and n is the refractive index of a substrate.

Figure 4:
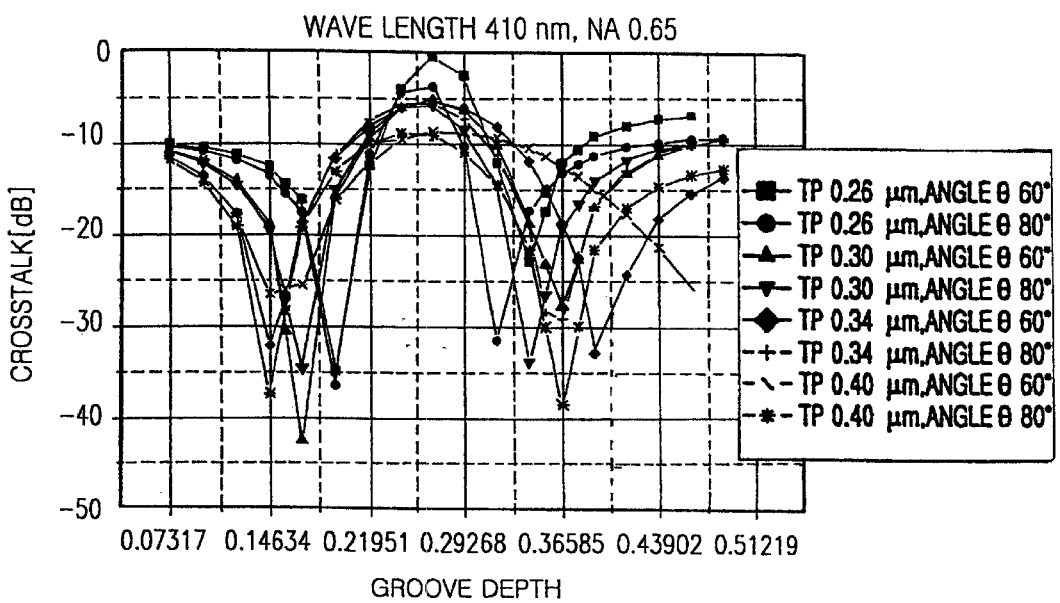
FIG. 4 illustrates the crosstalk signal with respect to the depth of the grooves when a track pitch varies at 0.26, 0.30, 0.34 and 0.40 μm and the slant angle of the grooves varies at 60° and 80°.
Figure 5:
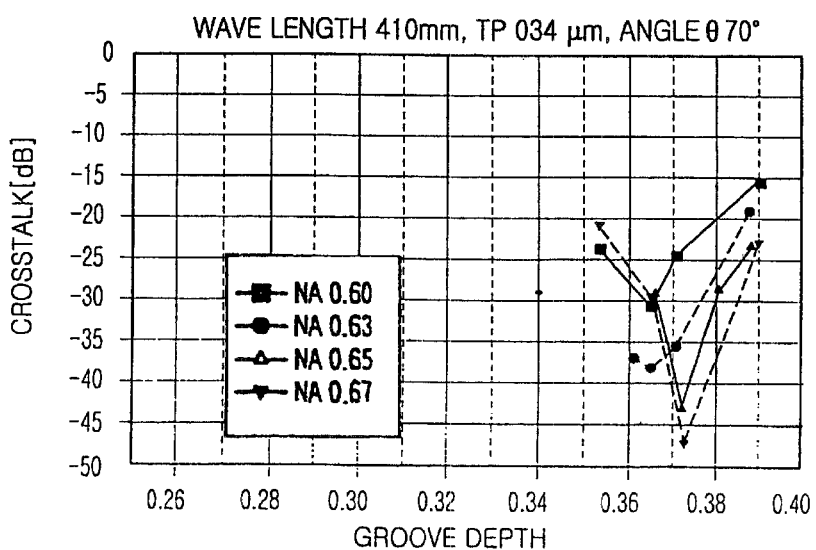
FIG. 5 illustrates the crosstalk signal with respect to the depth of grooves when the numerical aperture of an objective lens varies at 0.60, 0.63, 0.65 and 0.67.

Results of experiments are shown in FIGS. 4 and 5. FIG. 4 illustrates the crosstalk signal with respect to the depth of grooves when a track pitch varies at 0.26, 0.30, 0.34 and 0.40 μm and the slant angle of grooves at 60° and 80°. For this observation, a laser beam having a wavelength of 410 nm was irradiated onto an optical disc and the numerical aperture (NA) of an objective lens used was 0.65.

FIG. 5 illustrates the crosstalk signal with respect to the depth of grooves when the numerical aperture of an objective lens varies at 0.60, 0.63, 0.65 and 0.67. In this observation, the wavelength of a laser beam irradiated was 410 nm, the track pitch (TP) of an optical disc was 0.34 μm, and the slant angle θ of grooves was 70°.

As shown in FIGS. 4 and 5, the depth and slant angle of grooves, the track pitch and the NA influence an occurrence of crosstalk from adjacent tracks. The effect of these factors on the crosstalk will be qualitatively summarized as below. First, the depth of the grooves is the most biggest factor affecting crosstalk, and a crosstalk offset point exists in respective relatively shallow and deep groove ranges, as shown in FIG. 4. A smaller track pitch and a larger slant angle of grooves shift a minimum crosstalk point in the grooves upward near the surface of the substrate.

Meanwhile, a higher NA tends to shift the minimum crosstalk point down and requires deeper grooves for minimum crosstalk. Also, a groove depth margin for the minimal crosstalk is wider at a higher NA, compared to that at a smaller NA.

The above-mentioned qualitative relation of the groove depth, the track pitch, the slant angle of the grooves and the NA with respect to crosstalk, in particular, for minimum crosstalk, can be expressed as the following mathematical relation [1]. For the mathematical relation [1], the NA was varied from 0.6 to 0.67, the track pitch was varied from 0.26 to 0.40 μm, and the slant angle of the grooves was varied from 50 to 88° to decide the minimum crosstalk depth in the deep grooves.

$$D = 0.4022 - 0.4574 \times A + 0.6458 \times A^2 \quad [1]$$

where

D = physical groove depth × n/λ

$$A = \frac{NA \cdot TP}{\lambda} \times \frac{1}{\sin^2\theta}, \text{ and}$$

θ is the slant angle of the grooves between a top surface of lands and sidewalls of the grooves (or also described as a lateral extension of the lands or the grooves and an extension of the groove sidewalls).

Since the above mathematical relation is not practically applicable to the entire groove depth range, it is desirable to define an effective groove depth $D_{eff}$ at which at least phase reversal of a push-pull signal does not occur, based on the groove depth D which satisfies the mathematical relation [1]. In particular, the minimum difference between the groove depth at which the push-pull signal has zero value and the minimum crosstalk depth is approximately 15 nm, approximately 0.0844 in normalized units, and thus a groove depth region within ±0.0844 NA from the minimum crosstalk depth can be set as a crosstalk offset region in the deep grooves. The effective groove depth $D_{eff}$ can be expressed by the following mathematical relation [2].

$$D_{eff} = D \pm 0.844 \cdot NA \quad [2]$$

The ranges of the track pitch and the slant angle of the grooves are determined as follows. First of all, the lower limit of the track pitch in a substrate of an optical disc according to an embodiment of the present invention must be equal to the width of a recording portion of lands or grooves, which is greater than or equal to the width of a record mark. The upper limit of the track pitch varies depending on the slant angle θ of the grooves. From this point of view, the track pitch with respect to the width of a minimum record mark, and the angle of the grooves must satisfy the following relation [3]

$$\tan\theta \geq \frac{D}{TP - W_m} \quad [3]$$

where $W_m$ is the width of the minimum record mark.

Another consideration for such a deep groove configuration according to the present invention is the crosstalk minimum depth. The crosstalk minimum depth is also influenced by the track pitch and the slant angle of the grooves. However, if the crosstalk minimum depth is greater than a predetermined depth in the grooves, the push-pull signal become too small to enable tracking. For example, if the groove depth is greater than or equal to 135 nm, the push-pull signal drops to 0.2 or less, which causes tracking failure. For this case the crosstalk minimum depth is determined to be 120 nm, taking into account the marginal values determined by the relation [2]. Thus, it is preferable that the track pitch and the slant angle of the grooves satisfy the following relation [4]

$$\sin^2\theta \geq 1.25 \times \frac{NA \cdot TP}{\lambda} \quad [4]$$

Preferably, the slant angle of the grooves and the track pitch are determined within the range satisfying the conditions of both of the relations [3] and [4].

In addition, the upper limit of the slant angle of the grooves cannot be greater than or equal to 90°. The upper limit of the track pitch is determined according to the conditions of optical recording systems, for example, recording capability and coding conditions, which is expressed by the following relation [5]

$$\text{upper limit of track pitch} = \quad [5]$$

$$\frac{\text{area of recordable region on optical disc}}{\text{minimum length of bytes} \times \text{amount of required data}}$$

where the area of recordable region on optical disc is $\pi(R_o^2 - R_i^2)$, $$\text{minimum length of bytes is } \frac{\lambda/2 \cdot NA}{2} \div m \times k, \text{ and}$$

amount of required data is user data × redundancy data × spare region, and where $R_o$ and $R_i$ are the outer and inner radii, respectively, of the recordable region on the optical disc, m is the number of channel bits per minimum mark, and k is the number of channel bits per byte.

For the 4.7-gigabyte DVD-RAM standard which has a sector configuration of 2,697 bytes per sector, a recording diameter of 24,100 to 57,500 μm and a spare region of 3%, assuming that for the mathematical relation [4] the wavelength of a laser beam is 400 nm and the numerical aperture is 0.6, the track pitch can be widened up to 0.473 μm for storage of 15-gigabyte of data. Also, if the wavelength of a laser beam is 400 nm and the NA is 0.65, the track pitch can be increased up to 0.427 μm for 18-gigabyte data storage.

Figure 6:
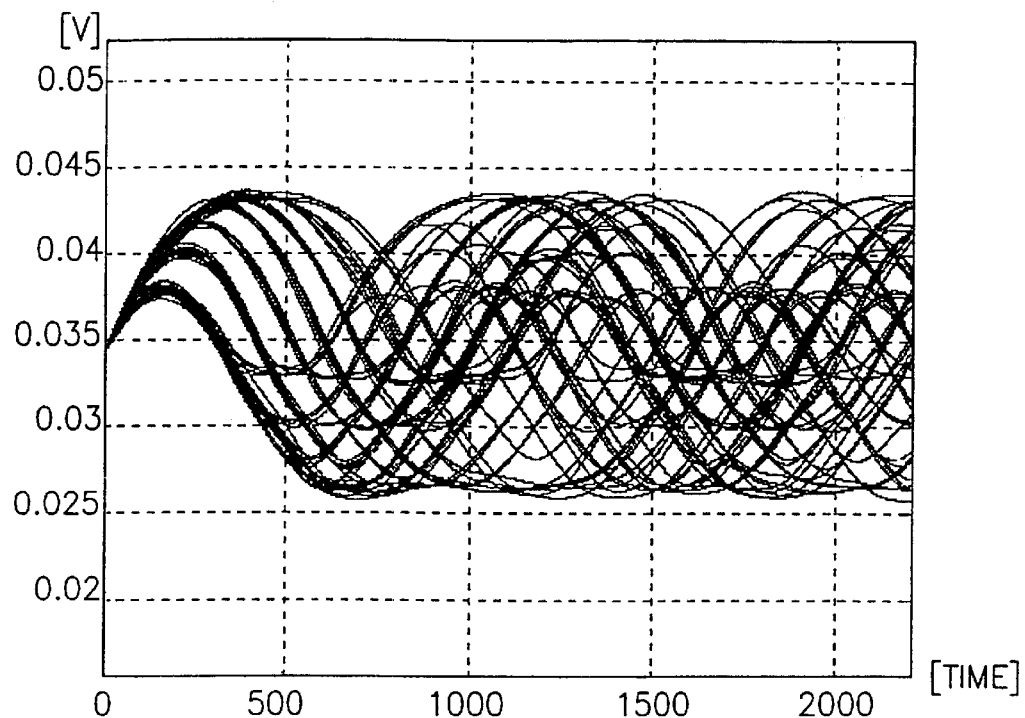
FIG. 6 shows waveforms illustrating jitter characteristics of an optical disc substrate with shallow grooves, measured by an oscilloscope.
Figure 7:
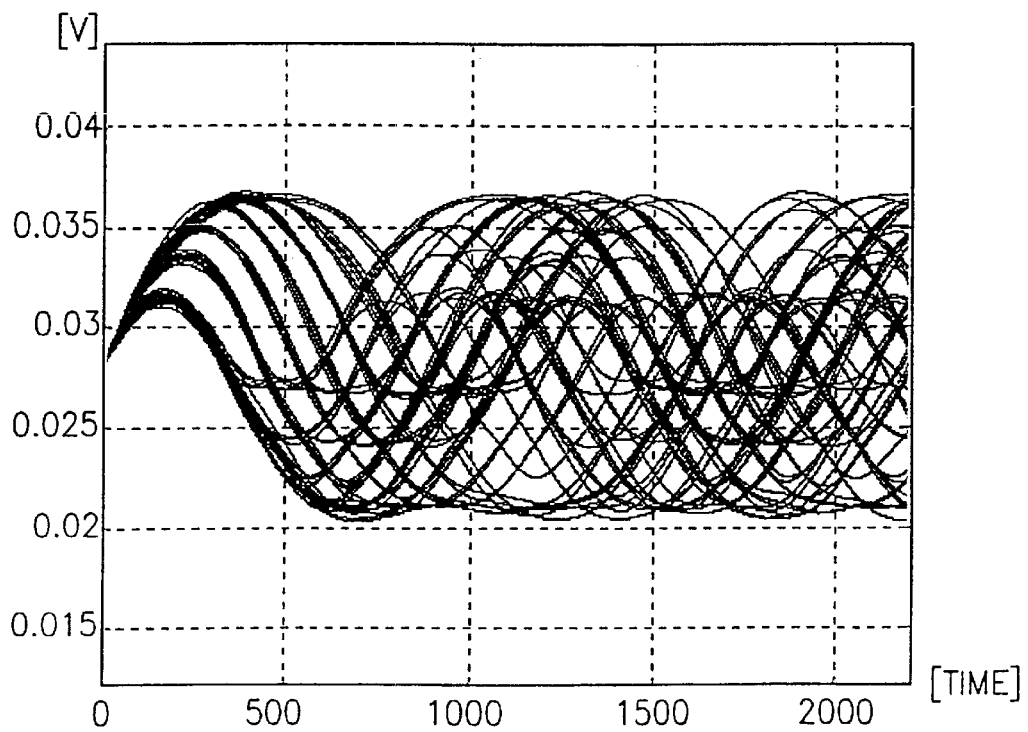
FIG. 7 shows waveforms illustrating jitter characteristics of an optical disc substrate with deep grooves according to an embodiment of the present invention, measured by an oscilloscope.

FIGS. 6 and 7 show waveforms illustrating the jitter characteristics by shallow grooves and deep grooves at a slant angle of 80°, respectively, which are measured by an oscilloscope.

Table 2 shows that the jitter characteristics are similar between shallow grooves and deep grooves slanted at the same angle as the grooves.

TABLE 2

|  | Shallow grooves | | Deep grooves |
| --- | --- | --- | --- |
|  | λ/6n, 60° | λ/6n, 80° | λ/3n, 80° |
| Jitter (after equalization) | 12.92% | 11.97% | 11.69% |

The substrate with deep grooves according to the present invention can be compatible with a 4.7-gigabyte DVD-RAM by merely changing the position of a header pit to avoid phase reversal of a push-pull signal by the deep grooves.

In the substrate according to the present invention, the depth and the slant angle of grooves are delimited using the mathematical relations [1] through [4], so that the maximum track pitch can be increased up to approximately 0.42 μm or more for a 15-gigabyte or 18-gigabyte optical disc with improved crosstalk, cross erase and tracking characteristics.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical disc substrate for land-and-groove recording of an optical disc, comprising:

a plurality of grooves having a predetermined depth, individual ones of the grooves having sidewalls slanted at an angle of θ; and a plurality of lands having a same level as a surface of the substrate;

wherein a depth D of the grooves for minimum crosstalk is determined by the following mathematical relation [1]:

$$D = 0.4022 - 0.4574 \times A + 0.6458 \times A^2, \quad [1]$$

where

D = physical groove depth$\times n/\lambda$, $$A = \frac{NA \cdot TP}{\lambda} \times \frac{1}{\sin^2 \theta},$$

TP indicates a track pitch of the optical disc substrate,

NA indicates a numerical aperture of an objective lens of an optical pickup,

θ is the slant angle of the grooves between a top surface of the lands and the groove sidewalls, λ is a wavelength of a laser beam of the optical pickup which is radiated on the optical disc through the objective lens for the land-and-groove recording; and n is a refractive index of the optical disc substrate.

2. The optical disc substrate of claim 1, wherein an effective groove depth $D_{eff}$ of the grooves is determined by the following mathematical relation [2]

$$D_{eff} = D \pm 0.844 \, NA. \quad [2]$$

3. The optical disc substrate of claim 2, wherein the track pitch TP and slant angle θ of the grooves satisfies the following relations [3] and [4]

$$\tan \theta \geq \frac{D}{TP - W_m} \quad [3]$$

where $W_m$ is a width of a minimum record mark of the optical disc, and $$\sin^2 \theta \geq 1.25 \times \frac{NA \cdot TP}{\lambda} \quad [4]$$

4. The optical disc substrate of claim 3, wherein the optical disc substrate is in accordance with a 4.7 gigabyte DVD-RAM standard which has a sector configuration of 2,697 bytes per sector, a recording diameter of 24,1000 to 57,500 μm and a spare region of approximately 3%, λ is 400 nm, the numerical aperture NA is 0.6, and the track pitch has a width up to 473 μm for 15 gigabyte storage.

5. The optical disc substrate of claim 3, wherein the optical disc substrate is in accordance with a 4.7 gigabyte DVD-RAM standard which has a sector configuration of 2,697 bytes per sector, a recording diameter of 24,1000 to 57,500 μm and a spare region of approximately 3%, λ is 400 nm, the numerical aperture NA is 0.65 and the track pitch has a width up to 427 μm for 18 gigabyte storage.

6. The optical disc substrate of claim 2, wherein the substrate has a recording region of the lands and the grooves, and a lower limit of the track pitch TP is equal to a width of the recording region, which is greater than or equal to a width of a record mark of data on the substrate.

7. The optical disc substrate of claim 2, wherein the substrate has a recordable region of the lands and the grooves, and an upper limit of the track pitch TP follows the following mathematical relation [5]:

$$\text{upper limit of track pitch} = \frac{\text{area of recordable region on the optical disc}}{\text{minimum length of bytes} \times \text{amount of required data}} \quad [5]$$

where the area of the recordable region on the optical disc is $\pi(R_0^2 - R_1^2)$, $$\text{the minimum length of bytes is } \frac{\lambda/2 \cdot NA}{2} \div m \times k, \text{ and}$$

the amount of required data is user data×redundancy data×spare region, and where $R_o$ and $R_i$ are the outer and inner radii, respectively, of the recordable region on the optical disc, m is the number of channel bits per minimum mark, and k is the number of channel bits per byte.

8. The optical disc substrate of claim 2, wherein the optical disc substrate is in accordance with a 4.7 gigabyte DVD-RAM standard which has a sector configuration of 2,697 bytes per sector, a recording diameter of 24,1000 to 57,500 μm and a spare region of approximately 3%, λ is 400nm, the numerical aperture NA is 0.6, and the track pitch has a width up to 473 μm for 15 gigabyte storage.

9. The optical disc substrate of claim 2, wherein the optical disc substrate is in accordance with a 4.7 gigabyte DVD-RAM standard which has a sector configuration of 2,697 bytes per sector, a recording diameter of 24,1000 to 57,500 μm and a spare region of approximately 3%, λ is 400 nm, the numerical aperture NA is 0.65 and the track pitch has a width up to 427 μm for 18 gigabyte storage.

10. The optical disc substrate of claim 1, wherein the track pitch TP and slant angle θ grooves satisfies the following relations [3] and [4]

$$\tan \theta \geq \frac{D}{TP - W_m} \quad [3]$$

where $W_m$ is a width of a minimum record mark of the optical disc, and $$\sin^2 \theta \geq 1.25 \times \frac{NA \cdot TP}{\lambda}. \quad [4]$$

11. The optical disc substrate of claim 1, wherein the substrate has a recording region of the lands and the grooves, and a lower limit of the track pitch TP is equal to a width of the recording region, which is greater than or equal to a width of a record mark of data on the substrate.

12. The optical disc substrate of claim 1, wherein the substrate has a recordable region of the lands and the grooves, and an upper limit of the track pitch TP follows the following mathematical relation [5]:

$$\text{upper limit of track pitch} = \frac{\text{area of recordable region on optical disc}}{\text{minimum length of bytes} \times \text{amount of required data}} \quad [5]$$

where the area of recordable region on the optical disc is $\pi(R_0^2 - R_1^2)$, the minimum length of bytes is $\frac{\lambda/2 \cdot NA}{2} \div m \times k$, and the amount of required data is user data×redundancy data×spare region, and where $R_o$ and $R_i$ are the outer and inner radii, respectively, of the recordable region on the optical disc, m is the number of channel bits per minimum mark, and k is the number of channel bits per byte.

13. The optical disc substrate of claim 1, wherein the optical disc substrate is in accordance with a 4.7 gigabyte DVD-RAM standard which has a sector configuration of 2,697 bytes per sector, a recording diameter of 24,1000 to 57,500 μm and a spare region of approximately 3%, λ is 400 nm, the numerical aperture NA is 0.6, and the track pitch has a width up to 473 μm for 15 gigabyte storage.

14. The optical disc substrate of claim 1, wherein the optical disc substrate is in accordance with a 4.7 gigabyte DVD-RAM standard which has a sector configuration of 2,697 bytes per sector, a recording diameter of 24,1000 to 57,500 μm and a spare region of approximately 3%, λ is 400 nm, the numerical aperture NA is 0.65 and the track pitch has a width up to 427 μm for 18 gigabyte storage.

* * * * *

UNITED STATES PATENT AND TRADEMARK OFFICE
CERTIFICATE OF CORRECTION

PATENT NO.    : 6,411,593 B1
DATED         : June 25, 2002
INVENTOR(S)   : Du-seop Yoon et al.

It is certified that error appears in the above-identified patent and that said Letters Patent is hereby corrected as shown below:

<u>Title page, Item [54] and Column 1, line 1,</u>
Title should read -- OPTICAL DISC SUBSTRATE HAVING A GROOVE DEPTH TO MINIMIZE CROSSTALK AND CROSS-ERASE --.

Signed and Sealed this

Fifteenth Day of October, 2002

*Attest:*

*Attesting Officer*

JAMES E. ROGAN
*Director of the United States Patent and Trademark Office*